US012666304B2

(12) United States Patent
Chan et al.

(10) Patent No.: US 12,666,304 B2
(45) Date of Patent: Jun. 23, 2026

(54) SYSTEMS AND METHODS OF PROTOCOL DATA UNIT (PDU) SET DISCARD POLICIES

(71) Applicant: Meta Platforms Technologies, LLC, Menlo Park, CA (US)

(72) Inventors: Yee Sin Chan, San Francisco, CA (US); Zhu Ji, Cupertino, CA (US); Xiaodi Zhang, San Ramon, CA (US); Curt Wong, Bellevue, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 207 days.

(21) Appl. No.: 18/500,460

(22) Filed: Nov. 2, 2023

(65) Prior Publication Data

US 2024/0155426 A1 May 9, 2024

Related U.S. Application Data

(60) Provisional application No. 63/422,267, filed on Nov. 3, 2022.

(51) Int. Cl.
H04W 28/06 (2009.01)

(52) U.S. Cl.
CPC ................................... H04W 28/06 (2013.01)

(58) Field of Classification Search
None
See application file for complete search history.

(56) References Cited

U.S. PATENT DOCUMENTS

| | | | | |
|---|---|---|---|---|
| 2008/0123649 | A1* | 5/2008 | Wang | G06F 13/387 |
| | | | | 370/392 |
| 2009/0213823 | A1* | 8/2009 | Liu | H04W 24/02 |
| | | | | 370/338 |
| 2012/0314569 | A1* | 12/2012 | Liu | H04W 36/304 |
| | | | | 370/252 |

* cited by examiner

*Primary Examiner* — Robert M Morlan
(74) *Attorney, Agent, or Firm* — Greenberg Traurig LLP

(57) ABSTRACT

Systems and methods of protocol data unit (PDU) set discard policies may include a first device which receives a first PDU of a PDU set. The first PDU may include information relating to a PDU set discard policy. The first device may receive one or more second PDUs of the PDU set within a time window. The first device may apply the PDU set discard policy to the PDU set, based on a count of PDUs of the PDU set received within the time window, to selectively discard each of the PDUs of the PDU set according to the PDU set discard policy.

20 Claims, 7 Drawing Sheets

600

150

400

800

SYSTEMS AND METHODS OF PROTOCOL DATA UNIT (PDU) SET DISCARD POLICIES

CROSS-REFERENCE TO RELATED APPLICATIONS

The present application claims the benefit of and priority to U.S. Provisional Application No. 63/422,267, filed Nov. 3, 2022, the disclosure of which is incorporated herein by reference in its entirety.

FIELD OF DISCLOSURE

The present disclosure is generally related to communication for rendering artificial, mixed, virtual, or extended reality, including but not limited to systems and methods of protocol data unit set discard policies.

BACKGROUND

Artificial reality such as a virtual reality (VR), an augmented reality (AR), or a mixed reality (MR) provides immersive experience to a user. In one example, a user wearing a head wearable display (HWD) can turn the user's head, and an image of a virtual object corresponding to a location of the HWD and a gaze direction of the user can be displayed on the HWD to allow the user to feel as if the user is moving within a space of artificial reality (e.g., a VR space, an AR space, or a MR space).

SUMMARY

In one aspect, this disclosure is directed to a method. The method may include receiving, by a first device, a first protocol data unit (PDU) of a PDU set. The first PDU may include information relating to a PDU set discard policy. The method may include receiving, by the first device, one or more second PDUs of the PDU set within a time window. The method may include applying, by the first device, the PDU set discard policy to the PDU set, based on a count of PDUs of the PDU set received within the time window, to selectively discard each of the PDUs of the PDU set according to the PDU set discard policy.

In some embodiments, the PDU set discard policy includes information relating to a minimum ratio of PDUs of the PDU set successfully received by the first device. In some embodiments, the method includes discarding, by the first device, the first PDU and the one or more second PDUs of the PDU set, responsive to a ratio of the count of PDUs received within the time window to a number of PDUs of the PDU set not satisfying the minimum ratio. In some embodiments, the method includes processing by the first device, the first PDU and the one or more second PDUs of the PDU set, responsive to a ratio of the count of PDUs received within the time window to a number of PDUs of the PDU set satisfying the minimum ratio. In some embodiments, the minimum ratio is less than 1. In some embodiments, processing the first PDU and the one or more second PDUs includes transmitting, by the first device, the first PDU and the one or more second PDUs to a second device.

In some embodiments, receiving the first PDU and receiving the one or more second PDUs includes receiving, by the first device, via a buffer from an application layer of the first device, the first PDU of the PDU set; and receiving, by the first device, via the buffer from the application layer of the first device, the one or more second PDUs of the PDU set. In some embodiments, receiving the first PDU and receiving the one or more second PDUs includes receiving, by the first device, from a second device, the first PDU of the PDU set; and receiving, by the first device, from the second device, the one or more second PDUs of the PDU set. In some embodiments, the second device includes at least one of user equipment, a server, or a network device. In some embodiments, the PDU set is one of a plurality of PDU sets of a data burst, and the PDU set discard policy is applied to each of the plurality of PDU sets, and the information further includes a data burst discard policy. The method may include applying, by the first device, the data burst discard policy to the plurality of PDU sets, based on a second count of PDUs of the plurality of PDU sets of the data burst received within the time window, to selectively discard each of the plurality of PDU sets according to the data burst discard policy.

In another aspect, this disclosure is directed to a device. The device may include a transceiver. The device may include one or more processors configured to receive, via the transceiver, a first protocol data unit (PDU) of a PDU set. The first PDU may include information relating to a PDU set discard policy. The processor(s) may be configured to receive, via the transceiver, one or more second PDUs of the PDU set within a time window. The processor(s) may be configured to apply the PDU set discard policy to the PDU set, based on a count of PDUs of the PDU set received within the time window, to selectively discard each of the PDUs of the PDU set according to the PDU set discard policy.

In some embodiments, the PDU set discard policy comprises information relating to a minimum ratio of PDUs of the PDU set successfully received by the first device. In some embodiments, the one or more processors are configured to discard the first PDU and the one or more second PDUs of the PDU set, responsive to a ratio of the count of PDUs received within the time window to a number of PDUs of the PDU set not satisfying the minimum ratio. In some embodiments, the one or more processors are configured to process the first PDU and the one or more second PDUs of the PDU set, responsive to a ratio of the count of PDUs received within the time window to a number of PDUs of the PDU set satisfying the minimum ratio. In some embodiments, the minimum ratio is less than 1. In some embodiments, to process the first PDU and the one or more second PDUs, the one or more processors are configured to transmit, via the transceiver to a second device, the first PDU and the one or more second PDUs.

In some embodiments, the one or more processors are configured to receive, by the transceiver via a buffer from an application layer of the first device, the first PDU of the PDU set, and receive, by the transceiver via the buffer from the application layer of the first device, the one or more second PDUs of the PDU set. In some embodiments, the one or more processors are configured to receive, by the transceiver from a second device, the first PDU of the PDU set, and receive, by the transceiver from the second device, the one or more second PDUs of the PDU set. In some embodiments, the second device includes at least one of user equipment, a server, or a network device.

In yet another aspect, this disclosure is directed to a non-transitory computer readable medium storing instructions that, when executed by one or more processors, cause the one or more processors to receive a first protocol data unit (PDU) of a PDU set, the first PDU including information relating to a PDU set discard policy. The instructions may cause the one or more processors to receive one or more second PDUs of the PDU set within a time window. The instructions may cause the one or more processors to apply the PDU set discard policy to the PDU set, based on a count of PDUs of the PDU set received within the time window, to selectively discard each of the PDUs of the PDU set according to the PDU set discard policy.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Figure 1:
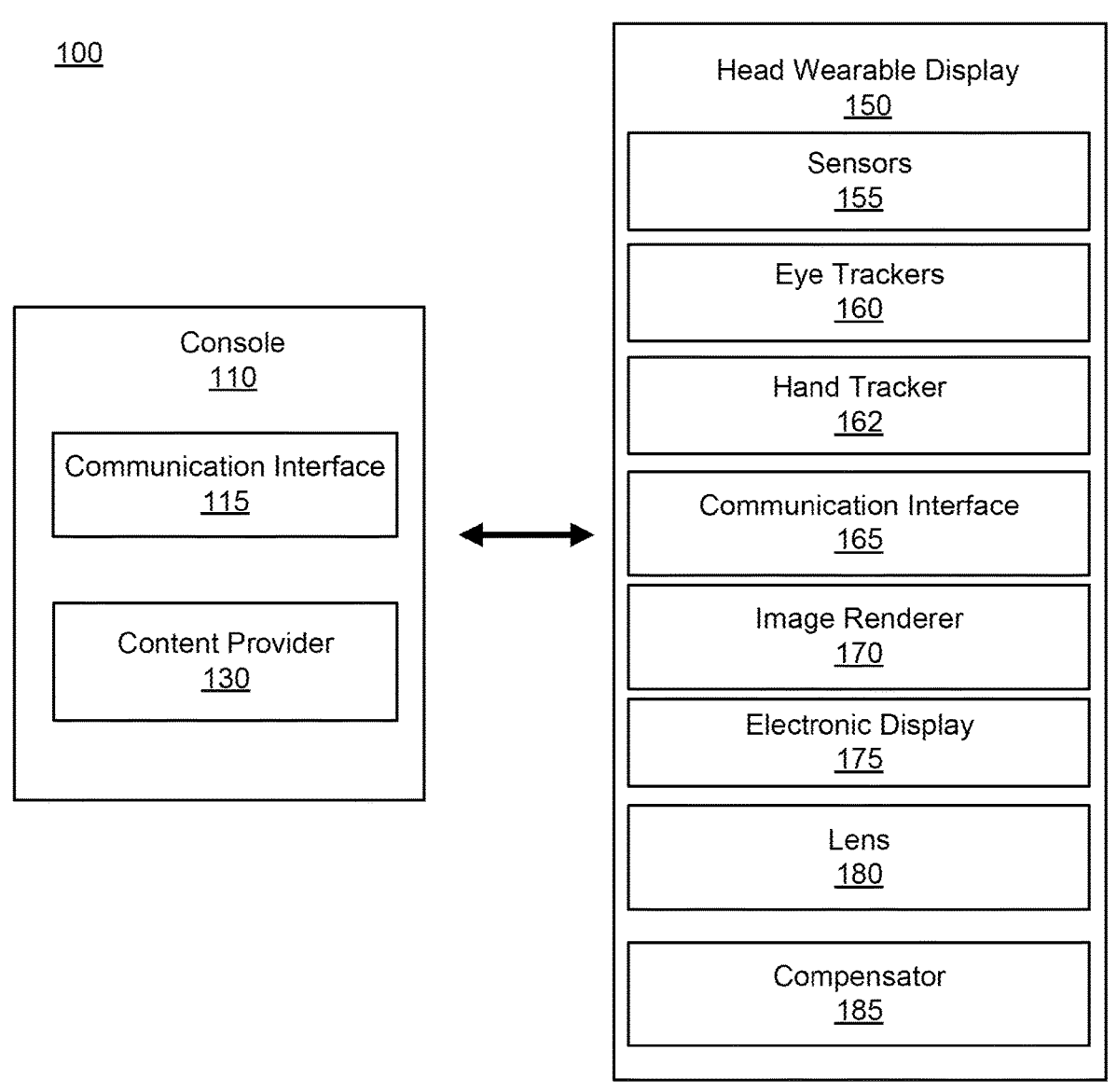
FIG. 1 is a diagram of a system environment including an artificial reality system, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are related to systems and methods for protocol data unit (PDU) set discard policies. A PDU set may be composed of one or more PDUs carrying a payload of one unit of information generated at an application level for a device (e.g., a frame or video slice for extended reality management [XRM] services). In some implementations, all PDUs in a PDU Set may be used by the application layer for the corresponding unit of information. In other implementations, the application layer can still recover portions or of the information unit, when some PDUs are missing. In some embodiments, a transmitter may sent PDUs as a data burst, where a set of multiple PDUs are generated and sent by an application in a short period of time (or burst). Each data burst can be composed of multiple PDU sets.

Within the context of application level forward error correction (AL-FEC), at an application layer, source block packets from 0 to K−1 may identify the source symbols of a source block in sequential order, where K is the number of source symbols in the source block. Encoding Symbol IDs K onwards may identify repair symbols generated from the source symbols using an FEC encoder, such as RAPTOR.

Typically, N>=K packets are sent, carrying an FEC source or repair symbols. In some instances, the decoder may use any K or only a small amount more than K packet of the N packets to recover the source packets.

The PDU-Set Delay Budget (PSDB) may define an upper bound for the time that a PDU-Set may be delayed between the user equipment (UE) and the N6 termination point at the user plane function (UPF). PSDB applies to the downlink (DL) PDU-Set received by the UPF over the N6 interface, and to the uplink (UL) PDU-Set sent by the UE. For a certain 5G Quality of Service (QoS) identifiers (5QIs), the value of the PSDB is the same in UL and DL. In the case of network access, the PSDB is used to support the configuration of scheduling and link layer functions (e.g. the setting of scheduling priority weights and hybrid automatic repeat request (HARQ) target operating points). For guaranteed bit rate (GBR) QoS Flows using the Delay-critical resource type, a PDU-Set delayed more than PSDB is counted as lost if the QoS Flow is not exceeding the GFBR. For GBR QoS Flows with GBR resource type not exceeding GFBR, of the PDU-Sets shall commonly not experience a delay exceeding the 5QI's PSDB to a very high percentage. The PDU Set Discard Time (PSDT) may be an upper bound for the time that a PDU Set has been waiting for transmission at the sender of a link layer protocol (e.g. radio link control [RLC] in radio access network [RAN] of a cellular access) before being discarded. The PSDT applies to the DL PDU Set received by the UPF over the N6 interface, and to the UL PDU Set sent by the UE.

According to the systems and methods described herein, any device in the network (including at the modem on UE, radio access network device or UPF devices, or elsewhere) can automatically drop PDU sets when one or more PDUs have been dropped such that the PDU set cannot be decoded by a receiver device. The systems and methods described herein may set or define (e.g., at the PDCP layer) a discard timer and delay budget, with a PDU set boundary indication or data burst boundary indication. In some embodiments, the systems and methods described herein may drop a PDU set where the number of PDUs dropped exceeds a number of redundant packets within the set (e.g., the ratio of K and N, where K is the number of PDUs corresponding to media content to be sent [for example] and N is to the total number of PDUs). In some embodiments, the application layer for a transmitting device may send the ratio to network devices, including the modem of the transmitting device, to apply the discard policies.

FIG. 1 is a block diagram of an example artificial reality system environment 100. In some embodiments, the artificial reality system environment 100 includes a HWD 150 worn by a user, and a console 110 providing content of artificial reality to the HWD 150. The HWD 150 may be referred to as, include, or be part of a head mounted display (HMD), head mounted device (HMD), head wearable device (HWD), head worn display (HWD) or head worn device (HWD). The HWD 150 may detect its location and/or orientation of the HWD 150 as well as a shape, location, and/or an orientation of the body/hand/face of the user, and provide the detected location/or orientation of the HWD 150 and/or tracking information indicating the shape, location, and/or orientation of the body/hand/face to the console 110. The console 110 may generate image data indicating an image of the artificial reality according to the detected location and/or orientation of the HDM 150, the detected shape, location and/or orientation of the body/hand/face of the user, and/or a user input for the artificial reality, and transmit the image data to the HWD 150 for presentation. In some embodiments, the artificial reality system environment 100 includes more, fewer, or different components than shown in FIG. 1. In some embodiments, functionality of one or more components of the artificial reality system environment 100 can be distributed among the components in a different manner than is described here. For example, some of the functionality of the console 110 may be performed by the HWD 150. For example, some of the functionality of the HWD 150 may be performed by the console 110. In some embodiments, the console 110 is integrated as part of the HWD 150.

In some embodiments, the HWD 150 is an electronic component that can be worn by a user and can present or provide an artificial reality experience to the user. The HWD 150 may render one or more images, video, audio, or some combination thereof to provide the artificial reality experience to the user. In some embodiments, audio is presented via an external device (e.g., speakers and/or headphones) that receives audio information from the HWD 150, the console 110, or both, and presents audio based on the audio information. In some embodiments, the HWD 150 includes sensors 155, eye trackers 160, a hand tracker 162, a communication interface 165, an image renderer 170, an electronic display 175, a lens 180, and a compensator 185. These components may operate together to detect a location of the HWD 150 and a gaze direction of the user wearing the HWD 150, and render an image of a view within the artificial reality corresponding to the detected location and/or orientation of the HWD 150. In other embodiments, the HWD 150 includes more, fewer, or different components than shown in FIG. 1.

In some embodiments, the sensors 155 include electronic components or a combination of electronic components and software components that detect a location and an orientation of the HWD 150. Examples of the sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the eye trackers 160 include electronic components or a combination of electronic components and software components that determine a gaze direction of the user of the HWD 150. In some embodiments, the HWD 150, the console 110 or a combination of them may incorporate the gaze direction of the user of the HWD 150 to generate image data for artificial reality. In some embodiments, the eye trackers 160 include two eye trackers, where each eye tracker 160 captures an image of a corresponding eye and determines a gaze direction of the eye. In one example, the eye tracker 160 determines an angular rotation of the eye, a translation of the eye, a change in the torsion of the eye, and/or a change in shape of the eye, according to the captured image of the eye, and determines the relative gaze direction with respect to the HWD 150, according to the determined angular rotation, translation and the change in the torsion of the eye. In one approach, the eye tracker 160 may shine or project a predetermined reference or structured pattern on a portion of the eye, and capture an image of the eye to analyze the pattern projected on the portion of the eye to determine a relative gaze direction of the eye with respect to the HWD 150. In some embodiments, the eye trackers 160 incorporate the orientation of the HWD 150 and the relative gaze direction with respect to the HWD 150 to determine a gate direction of the user. Assuming for an example that the HWD 150 is oriented at a direction 30 degrees from a reference direction, and the relative gaze direction of the HWD 150 is −10 degrees (or 350 degrees) with respect to the HWD 150, the eye trackers 160 may determine that the gaze direction of the user is 20 degrees from the reference direction. In some embodiments, a user of the HWD 150 can configure the HWD 150 (e.g., via user settings) to enable or disable the eye trackers 160. In some embodiments, a user of the HWD 150 is prompted to enable or disable the eye trackers 160.

In some embodiments, the hand tracker 162 includes an electronic component or a combination of an electronic component and a software component that tracks a hand of the user. In some embodiments, the hand tracker 162 includes or is coupled to an imaging sensor (e.g., camera) and an image processor that can detect a shape, a location and an orientation of the hand. The hand tracker 162 may generate hand tracking measurements indicating the detected shape, location and orientation of the hand.

In some embodiments, the communication interface 165 includes an electronic component or a combination of an electronic component and a software component that communicates with the console 110. The communication interface 165 may communicate with a communication interface 115 of the console 110 through a communication link. The communication link may be a wireless link. Examples of the wireless link can include a cellular communication link, a near field communication link, Wi-Fi, Bluetooth, 60 GHz wireless link, or any communication wireless communication link. Through the communication link, the communication interface 165 may transmit to the console 110 data indicating the determined location and/or orientation of the HWD 150, the determined gaze direction of the user, and/or hand tracking measurement. Moreover, through the communication link, the communication interface 165 may receive from the console 110 image data indicating or corresponding to an image to be rendered and additional data associated with the image.

In some embodiments, the image renderer 170 includes an electronic component or a combination of an electronic component and a software component that generates one or more images for display, for example, according to a change in view of the space of the artificial reality. In some embodiments, the image renderer 170 is implemented as a processor (or a graphical processing unit (GPU)) that executes instructions to perform various functions described herein. The image renderer 170 may receive, through the communication interface 165, image data describing an image of artificial reality to be rendered and additional data associated with the image, and render the image through the electronic display 175. In some embodiments, the image data from the console 110 may be encoded, and the image renderer 170 may decode the image data to render the image. In some embodiments, the image renderer 170 receives, from the console 110 in additional data, object information indicating virtual objects in the artificial reality space and depth information indicating depth (or distances from the HWD 150) of the virtual objects. In one aspect, according to the image of the artificial reality, object information, depth information from the console 110, and/or updated sensor measurements from the sensors 155, the image renderer 170 may perform shading, reprojection, and/or blending to update the image of the artificial reality to correspond to the updated location and/or orientation of the HWD 150. Assuming that a user rotated his head after the initial sensor measurements, rather than recreating the entire image responsive to the updated sensor measurements, the image renderer 170 may generate a small portion (e.g., 10%) of an image corresponding to an updated view within the artificial reality according to the updated sensor measurements, and append the portion to the image in the image data from the console 110 through reprojection. The image renderer 170 may perform shading and/or blending on the appended edges. Hence, without recreating the image of the artificial reality according to the updated sensor measurements, the image renderer 170 can generate the image of the artificial reality. In some embodiments, the image renderer 170 receives hand model data indicating a shape, a location and an orientation of a hand model corresponding to the hand of the user, and overlay the hand model on the image of the artificial reality. Such hand model may be presented as a visual feedback to allow a user to provide various interactions within the artificial reality.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the HWD 150 is worn by a user, the electronic display 175 is located proximate (e.g., less than 3 inches) to the user's eyes. In one aspect, the electronic display 175 emits or projects light towards the user's eyes according to image generated by the image renderer 170.

In some embodiments, the lens 180 is a mechanical component that alters received light from the electronic display 175. The lens 180 may magnify the light from the electronic display 175, and correct for optical error associated with the light. The lens 180 may be a Fresnel lens, a convex lens, a concave lens, a filter, or any suitable optical component that alters the light from the electronic display 175. Through the lens 180, light from the electronic display 175 can reach the pupils, such that the user can see the image displayed by the electronic display 175, despite the close proximity of the electronic display 175 to the eyes.

In some embodiments, the compensator 185 includes an electronic component or a combination of an electronic component and a software component that performs compensation to compensate for any distortions or aberrations. In one aspect, the lens 180 introduces optical aberrations such as a chromatic aberration, a pin-cushion distortion, barrel distortion, etc. The compensator 185 may determine a compensation (e.g., predistortion) to apply to the image to be rendered from the image renderer 170 to compensate for the distortions caused by the lens 180, and apply the determined compensation to the image from the image renderer 170. The compensator 185 may provide the predistorted image to the electronic display 175.

In some embodiments, the console 110 is an electronic component or a combination of an electronic component and a software component that provides content to be rendered to the HWD 150. In one aspect, the console 110 includes a communication interface 115 and a content provider 130. These components may operate together to determine a view (e.g., a FOV of the user) of the artificial reality corresponding to the location of the HWD 150 and the gaze direction of the user of the HWD 150, and can generate image data indicating an image of the artificial reality corresponding to the determined view. In addition, these components may operate together to generate additional data associated with the image. Additional data may be information associated with presenting or rendering the artificial reality other than the image of the artificial reality. Examples of additional data include, hand model data, mapping information for translating a location and an orientation of the HWD 150 in a physical space into a virtual space (or simultaneous localization and mapping (SLAM) data), eye tracking data, motion vector information, depth information, edge information, object information, etc. The console 110 may provide the image data and the additional data to the HWD 150 for presentation of the artificial reality. In other embodiments, the console 110 includes more, fewer, or different components than shown in FIG. 1. In some embodiments, the console 110 is integrated as part of the HWD 150.

In some embodiments, the communication interface 115 is an electronic component or a combination of an electronic component and a software component that communicates with the HWD 150. The communication interface 115 may be a counterpart component to the communication interface 165 to communicate with a communication interface 115 of the console 110 through a communication link (e.g., wireless link). Through the communication link, the communication interface 115 may receive from the HWD 150 data indicating the determined location and/or orientation of the HWD 150, the determined gaze direction of the user, and the hand tracking measurement. Moreover, through the communication link, the communication interface 115 may transmit to the HWD 150 image data describing an image to be rendered and additional data associated with the image of the artificial reality.

The content provider 130 can include or correspond to a component that generates content to be rendered according to the location and/or orientation of the HWD 150. In some embodiments, the content provider 130 may incorporate the gaze direction of the user of the HWD 150, and a user interaction in the artificial reality based on hand tracking measurements to generate the content to be rendered. In one aspect, the content provider 130 determines a view of the artificial reality according to the location and/or orientation of the HWD 150. For example, the content provider 130 maps the location of the HWD 150 in a physical space to a location within an artificial reality space, and determines a view of the artificial reality space along a direction corresponding to the mapped orientation from the mapped location in the artificial reality space. The content provider 130 may generate image data describing an image of the determined view of the artificial reality space, and transmit the image data to the HWD 150 through the communication interface 115. The content provider 130 may also generate a hand model corresponding to a hand of a user of the HWD 150 according to the hand tracking measurement, and generate hand model data indicating a shape, a location, and an orientation of the hand model in the artificial reality space. In some embodiments, the content provider 130 may generate additional data including motion vector information, depth information, edge information, object information, hand model data, etc., associated with the image, and transmit the additional data together with the image data to the HWD 150 through the communication interface 115. The content provider 130 may encode the image data describing the image, and can transmit the encoded data to the HWD 150. In some embodiments, the content provider 130 generates and provides the image data to the HWD 150 periodically (e.g., every 11 ms). In one aspect, the communication interface 115 can adaptively transmit the additional data to the HWD 150 as described below with respect to FIGS. 3 through 6.

Figure 2:
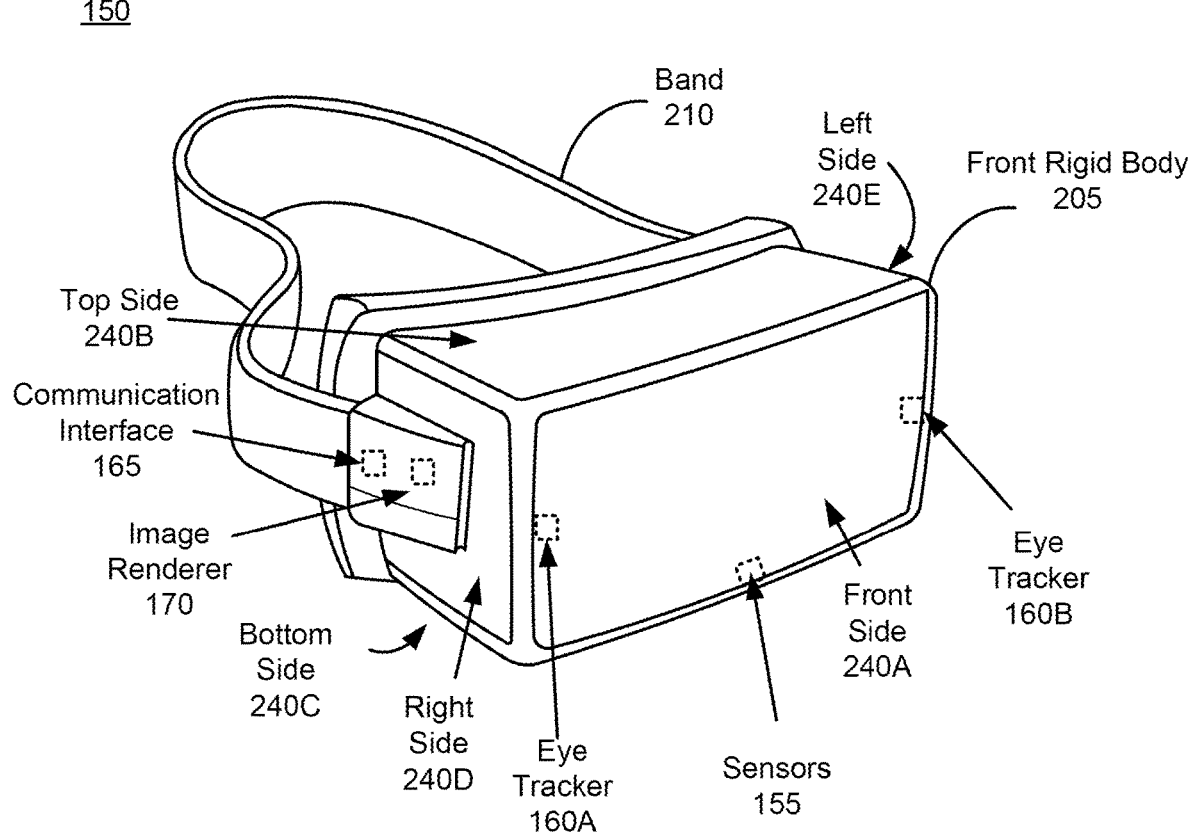
FIG. 2 is a diagram of a head wearable display, according to an example implementation of the present disclosure.

FIG. 2 is a diagram of a HWD 150, in accordance with an example embodiment. In some embodiments, the HWD 150 includes a front rigid body 205 and a band 210. The front rigid body 205 includes the electronic display 175 (not shown in FIG. 2), the lens 180 (not shown in FIG. 2), the sensors 155, the eye trackers 160A, 160B, the communication interface 165, and the image renderer 170. In the embodiment shown by FIG. 2, the communication interface 165, the image renderer 170, and the sensors 155 are located within the front rigid body 205, and may not visible to the user. In other embodiments, the HWD 150 has a different configuration than shown in FIG. 2. For example, the communication interface 165, the image renderer 170, the eye trackers 160A, 160B, and/or the sensors 155 may be in different locations than shown in FIG. 2.

Figure 3:
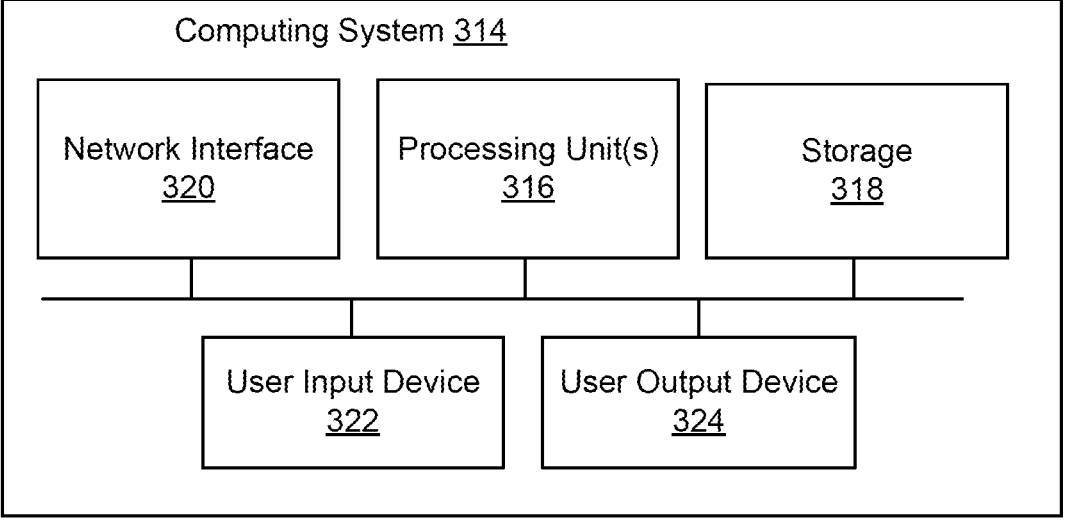
FIG. 3 is a block diagram of a computing environment according to an example implementation of the present disclosure.

Various operations described herein can be implemented on computer systems. FIG. 3 shows a block diagram of a representative computing system 314 usable to implement the present disclosure. In some embodiments, the console 110, the HWD 150 or both of FIG. 1 are implemented by the computing system 314. Computing system 314 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 314 can be implemented to provide VR, AR, MR experience. In some embodiments, the computing system 314 can include conventional computer components such as processors 316, storage device 318, network interface 320, user input device 322, and user output device 324.

Network interface 320 can provide a connection to a wide area network (e.g., the Internet) to which WAN interface of a remote server system is also connected. Network interface 320 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 322 can include any device (or devices) via which a user can provide signals to computing system 314; computing system 314 can interpret the signals as indicative of particular user requests or information. User input device 322 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 324 can include any device via which computing system 314 can provide information to a user. For example, user output device 324 can include a display to display images generated by or delivered to computing system 314. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 324 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 316 can provide various functionality for computing system 314, including any of the functionality described herein as being performed by a server or client, or other functionality associated with message management services.

It will be appreciated that computing system 314 is illustrative and that variations and modifications are possible. Computer systems used in connection with the present disclosure can have other capabilities not specifically described here. Further, while computing system 314 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Figure 4:
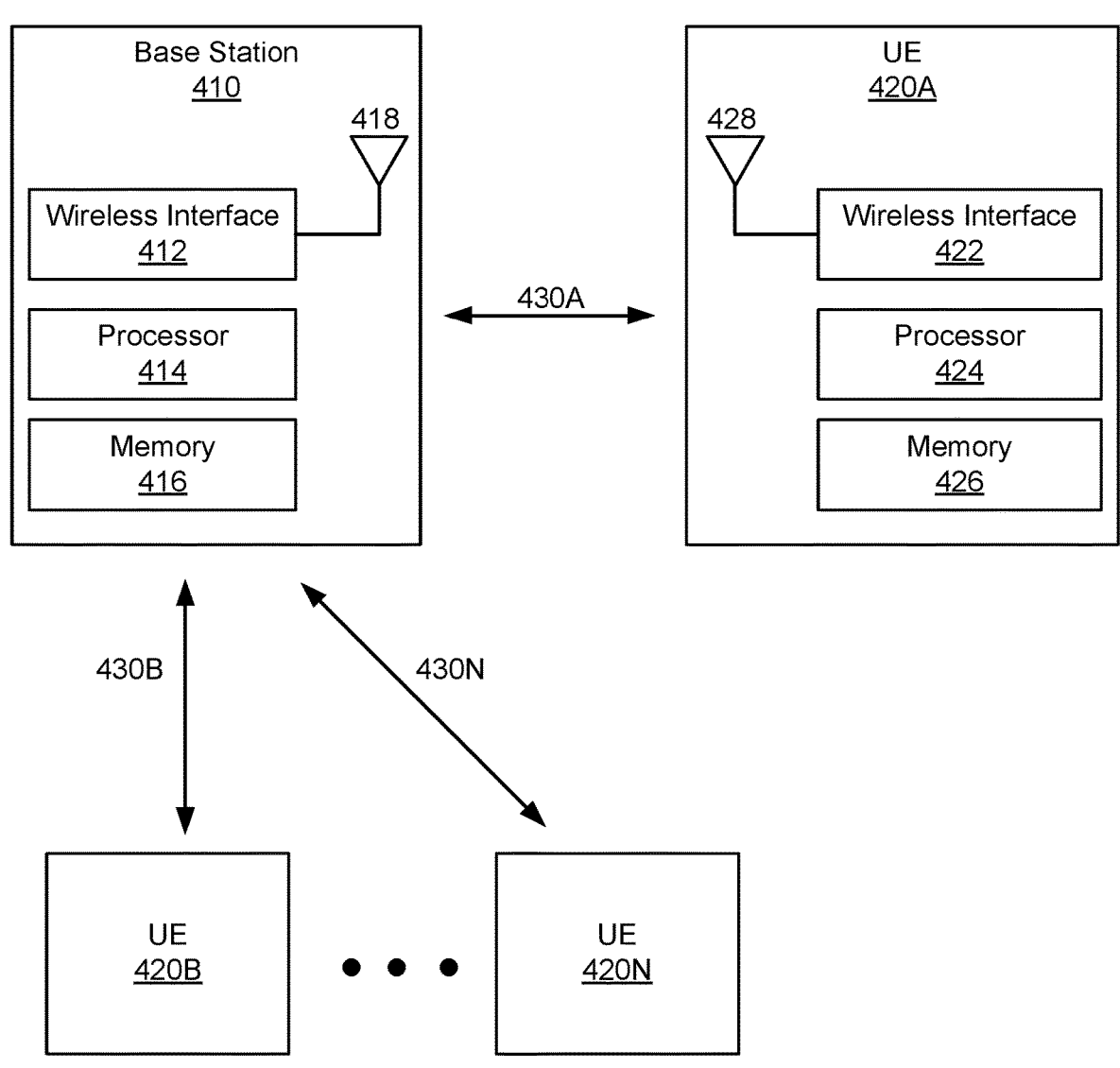
FIG. 4 is a diagram of an example wireless communication system, according to an example implementation of the present disclosure.

FIG. 4 illustrates an example wireless communication system 400. The wireless communication system 400 may include a base station 410 (also referred to as "a wireless communication node 410" or "a station 410") and one or more user equipment (UEs) 420 (also referred to as "wireless communication devices 420" or "terminal devices 420"). The UEs 420 may be or include any device or component described above with reference to FIG. 1-FIG. 3, such as the console 110, head wearable display 150, or the like. The base station 410 and UEs 420 may include components, elements, and/or hardware similar to those described above with reference to FIG. 1-FIG. 3. The base station 410 and the UEs 420 may communicate through wireless commination links 430A, 430B, 430C. The wireless communication link 430 may be a cellular communication link conforming to 3G, 4G, 5G or other cellular communication protocols or a Wi-Fi communication protocol. In one example, the wireless communication link 430 supports, employs or is based on an orthogonal frequency division multiple access (OFDMA). In one aspect, the UEs 420 are located within a geographical boundary with respect to the base station 410, and may communicate with or through the base station 410. In some embodiments, the wireless communication system 400 includes more, fewer, or different components than shown in FIG. 4. For example, the wireless communication system 400 may include one or more additional base stations 410 than shown in FIG. 4.

In some embodiments, the UE 420 may be a user device such as a mobile phone, a smart phone, a personal digital assistant (PDA), tablet, laptop computer, wearable computing device, etc. Each UE 420 may communicate with the base station 410 through a corresponding communication link 430. For example, the UE 420 may transmit data to a base station 410 through a wireless communication link 430, and receive data from the base station 410 through the wireless communication link 430. Example data may include audio data, image data, text, etc. Communication or transmission of data by the UE 420 to the base station 410 may be referred to as an uplink communication. Communication or reception of data by the UE 420 from the base station 410 may be referred to as a downlink communication. In some embodiments, the UE 420A includes a wireless interface 422, a processor 424, a memory device 426, and one or more antennas 428. These components may be embodied as hardware, software, firmware, or a combination thereof. In some embodiments, the UE 420A includes more, fewer, or different components than shown in FIG. 4. For example, the UE 420 may include an electronic display and/or an input device. For example, the UE 420 may include additional antennas 428 and wireless interfaces 422 than shown in FIG. 4.

The antenna 428 may be a component that receives a radio frequency (RF) signal and/or transmit a RF signal through a wireless medium. The RF signal may be at a frequency between 200 MHz to 100 GHz. The RF signal may have packets, symbols, or frames corresponding to data for communication. The antenna 428 may be a dipole antenna, a patch antenna, a ring antenna, or any suitable antenna for wireless communication. In one aspect, a single antenna 428 is utilized for both transmitting the RF signal and receiving the RF signal. In one aspect, different antennas 428 are utilized for transmitting the RF signal and receiving the RF signal. In one aspect, multiple antennas 428 are utilized to support multiple-in, multiple-out (MIMO) communication.

The wireless interface 422 includes or is embodied as a transceiver for transmitting and receiving RF signals through a wireless medium. The wireless interface 422 may communicate with a wireless interface 412 of the base station 410 through a wireless communication link 430A. In one configuration, the wireless interface 422 is coupled to one or more antennas 428. In one aspect, the wireless interface 422 may receive the RF signal at the RF frequency received through antenna 428, and downconvert the RF signal to a baseband frequency (e.g., 0-1 GHz). The wireless interface 422 may provide the downconverted signal to the processor 424. In one aspect, the wireless interface 422 may receive a baseband signal for transmission at a baseband frequency from the processor 424, and upconvert the baseband signal to generate a RF signal. The wireless interface 422 may transmit the RF signal through the antenna 428.

The processor 424 is a component that processes data. The processor 424 may be embodied as field programmable gate array (FPGA), application specific integrated circuit (ASIC), a logic circuit, etc. The processor 424 may obtain instructions from the memory device 426, and executes the instructions. In one aspect, the processor 424 may receive downconverted data at the baseband frequency from the wireless interface 422, and decode or process the downconverted data. For example, the processor 424 may generate audio data or image data according to the downconverted data, and present an audio indicated by the audio data and/or an image indicated by the image data to a user of the UE 420A. In one aspect, the processor 424 may generate or obtain data for transmission at the baseband frequency, and encode or process the data. For example, the processor 424 may encode or process image data or audio data at the baseband frequency, and provide the encoded or processed data to the wireless interface 422 for transmission.

The memory device 426 is a component that stores data. The memory device 426 may be embodied as random access memory (RAM), flash memory, read only memory (ROM), erasable programmable read-only memory (EPROM), electrically erasable programmable read-only memory (EEPROM), registers, a hard disk, a removable disk, a CD-ROM, or any device capable for storing data. The memory device 426 may be embodied as a non-transitory computer readable medium storing instructions executable by the processor 424 to perform various functions of the UE 420A disclosed herein. In some embodiments, the memory device 426 and the processor 424 are integrated as a single component.

In some embodiments, each of the UEs 420B . . . 420N includes similar components of the UE 420A to communicate with the base station 410. Thus, detailed description of duplicated portion thereof is omitted herein for the sake of brevity.

In some embodiments, the base station 410 may be an evolved node B (eNB), a serving eNB, a target eNB, a femto station, or a pico station. The base station 410 may be communicatively coupled to another base station 410 or other communication devices through a wireless communication link and/or a wired communication link. The base station 410 may receive data (or a RF signal) in an uplink communication from a UE 420. Additionally or alternatively, the base station 410 may provide data to another UE 420, another base station, or another communication device. Hence, the base station 410 allows communication among UEs 420 associated with the base station 410, or other UEs associated with different base stations. In some embodiments, the base station 410 includes a wireless interface 412, a processor 414, a memory device 416, and one or more antennas 418. These components may be embodied as hardware, software, firmware, or a combination thereof. In some embodiments, the base station 410 includes more, fewer, or different components than shown in FIG. 4. For example, the base station 410 may include an electronic display and/or an input device. For example, the base station 410 may include additional antennas 418 and wireless interfaces 412 than shown in FIG. 4.

The antenna 418 may be a component that receives a radio frequency (RF) signal and/or transmit a RF signal through a wireless medium. The antenna 418 may be a dipole antenna, a patch antenna, a ring antenna, or any suitable antenna for wireless communication. In one aspect, a single antenna 418 is utilized for both transmitting the RF signal and receiving the RF signal. In one aspect, different antennas 418 are utilized for transmitting the RF signal and receiving the RF signal. In one aspect, multiple antennas 418 are utilized to support multiple-in, multiple-out (MIMO) communication.

The wireless interface 412 includes or is embodied as a transceiver for transmitting and receiving RF signals through a wireless medium. The wireless interface 412 may communicate with a wireless interface 422 of the UE 420 through a wireless communication link 430. In one configuration, the wireless interface 412 is coupled to one or more antennas 418. In one aspect, the wireless interface 412 may receive the RF signal at the RF frequency received through antenna 418, and downconvert the RF signal to a baseband frequency (e.g., 0~1 GHz). The wireless interface 412 may provide the downconverted signal to the processor 424. In one aspect, the wireless interface 422 may receive a baseband signal for transmission at a baseband frequency from the processor 414, and upconvert the baseband signal to generate a RF signal.

The wireless interface 412 may transmit the RF signal through the antenna 418.

The processor 414 is a component that processes data. The processor 414 may be embodied as FPGA, ASIC, a logic circuit, etc. The processor 414 may obtain instructions from the memory device 416, and executes the instructions. In one aspect, the processor 414 may receive downconverted data at the baseband frequency from the wireless interface 412, and decode or process the downconverted data. For example, the processor 414 may generate audio data or image data according to the downconverted data. In one aspect, the processor 414 may generate or obtain data for transmission at the baseband frequency, and encode or process the data. For example, the processor 414 may encode or process image data or audio data at the baseband frequency, and provide the encoded or processed data to the wireless interface 412 for transmission. In one aspect, the processor 414 may set, assign, schedule, or allocate communication resources for different UEs 420. For example, the processor 414 may set different modulation schemes, time slots, channels, frequency bands, etc. for UEs 420 to avoid interference. The processor 414 may generate data (or UL CGs) indicating configuration of communication resources, and provide the data (or UL CGs) to the wireless interface 412 for transmission to the UEs 420.

The memory device 416 is a component that stores data. The memory device 416 may be embodied as RAM, flash memory, ROM, EPROM, EEPROM, registers, a hard disk, a removable disk, a CD-ROM, or any device capable for storing data. The memory device 416 may be embodied as a non-transitory computer readable medium storing instructions executable by the processor 414 to perform various functions of the base station 410 disclosed herein. In some embodiments, the memory device 416 and the processor 414 are integrated as a single component.

In some embodiments, communication between the base station 410 and the UE 420 is based on one or more layers of Open Systems Interconnection (OSI) model. The OSI model may include layers including: a physical layer, a Medium Access Control (MAC) layer, a Radio Link Control (RLC) layer, a Packet Data Convergence Protocol (PDCP) layer, a Radio Resource Control (RRC) layer, a Non Access Stratum (NAS) layer or an Internet Protocol (IP) layer, and other layer.

Figures 5, 6:
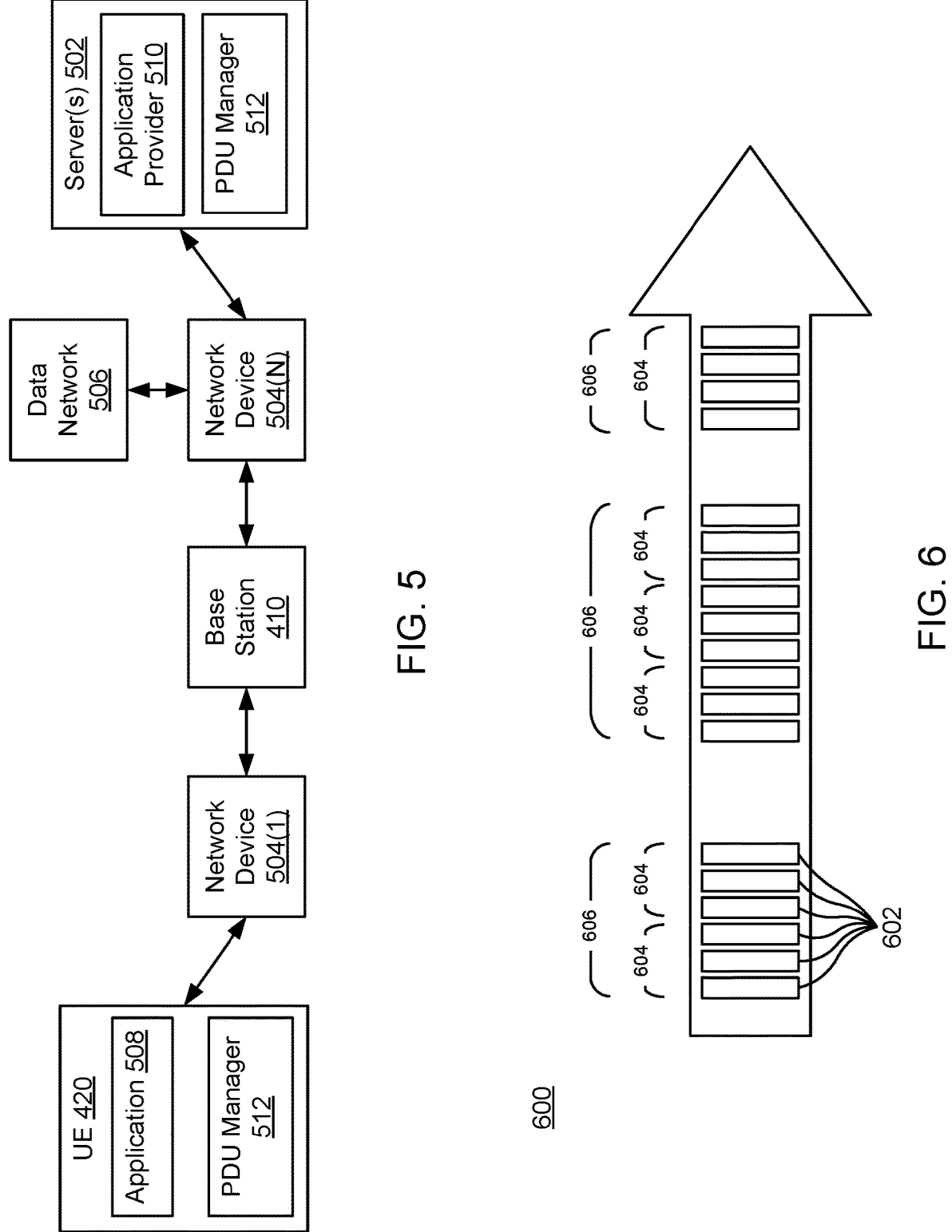
FIG. 5 is a block diagram of a system for protocol data unit (PDU) discard policies, according to an example implementation of the present disclosure.
FIG. 6 is a diagram of traffic flow from a sender device to a receiver device, according to an example implementation of the present disclosure.

Referring now to FIG. 5, depicted is a block diagram of a system 500 for protocol data unit (PDU) discard policies, according to an example implementation of the present disclosure. The system 500 may include user equipment (UE) 420 communicably coupled to one or more server(s) 502. The UE 420 may be the same as or similar to the UE 420 described above with reference to FIG. 4. The UE 520 may be communicably coupled to the server(s) 502 via various network devices 504 and base station 410. The base station 410 may be the same as or similar to the base station 410 described above with reference to FIG. 4. The network devices 504 may be or include any networking device, component, or node along the network path between the UE 420 and server(s) 502. For example, the network devices 504 may include routers, switches, or any other network nodes. In various embodiments, the server(s) 502 may be configured to communicate with a data network 506 (e.g., a trusted data network 506) via a network exposure function and/or policy control function). The server(s) 502 may be configured to communicate data via a user plane function (UPF) to the base station 410 (e.g., a radio access network [RAN]), and the base station 410 may route the data from the server(s) 502 via various network devices 504 to the UE 420.

The UE 520 may be configured to execute an application 508 hosted by an application provider 510 on the server(s) 502. In various embodiments, the application 508 may be an extended reality (XR) application (e.g., an augmented reality (AR), virtual reality (VR), mixed reality (MR), or other XR application). The application 508 executing on the UE 420 may generate data for transmission to the server 502 (and vice versa). The UE 420 (or server 502) may be configured to transmit the data along the network path shown in FIG. 5 and described above to the endpoint or destination (e.g., to the server 502 or UE 420).

Referring now to FIG. 6, depicted is a diagram of traffic flow 600 from a sender device to a receiver device, according to an example implementation of the present disclosure. In some embodiments, the sender device may be the UE 420 and the receiver device may be the server 502. In some embodiments, the sender device may be a network device 504 and the receiver device may be the base station 410. In some embodiments, the sender device may be the base station 410 and the receiver device may be the server 502 and/or the UE 420. In this regard, the sender device and receiver device may be or include any node along the network path shown in FIG. 5.

As shown in FIG. 6, the traffic flow 600 may include protocol data units (PDUs) 602 which may be grouped or otherwise sent in a PDU set 604. In some embodiments, multiple PDU sets 604 may be sent in a data burst 606. In this regard, a sender device may generate a PDU set 604 including one or more PDUs 602. Each PDU 602 may include, contain, or otherwise carry various unit(s) of information generated at the application level (e.g., by the application 508, for example). For example, where the application 508 is an XR application, a PDU 602 may include a frame or video slice for the XR application. In some implementations, each of the PDUs 602 in the PDU set are needed by the application 508 (or the receiver device) to use the corresponding unit of information.

Figure 7:
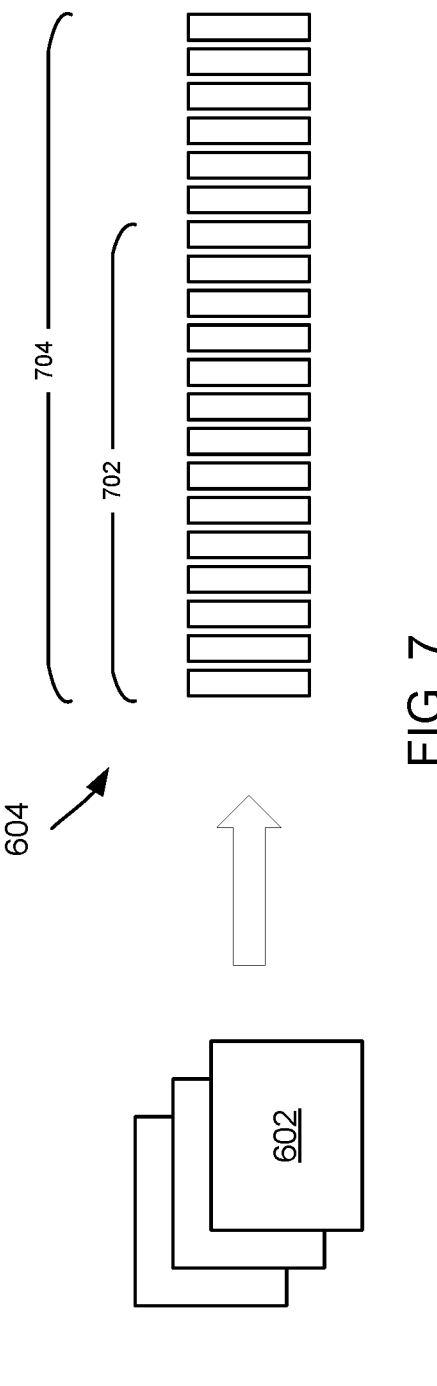
FIG. 7 is a diagram depicting application-level forward error correction used to recover information, according to an example implementation of the present disclosure.

With reference to FIG. 7, in some implementations, the application layer may be configured to recover parts or all of the information unit, where some PDUs 602 are missing from the PDU set 604. For example, the receiver device may include an application level forward error correction (AL-FEC) decoder. As shown in FIG. 7, a PDU set 604 may include K source symbols 702 and N symbols 704. At the application layer, the source block packets from 0 to K−1 may identify the source symbols of a source block in sequential order, where K is the number of source symbols in the source block. Encoding symbol IDs K onwards may identify repair symbols generated from the source symbols using a FEC encoder. Typically, a greater number of N symbols 704 than K source symbols 702 are sent, which carry an FEC source or repair symbols. As such, an AL-FEC decoder at the receiver device may only need K symbols out of the N packets to recover the source packets. The ratio of K/N may be adaptive depending on the rate of changes of the channel conditions.

Referring back to FIG. 5, in various embodiments, a device or node along the network path may include a PDU manager 512. The PDU manager 512 may be or include any device, component, element, or hardware designed or configured to implement, deploy, use, or otherwise execute a PDU set discard policy, to selectively discard and/or process PDUs 602 of a PDU set 604. While shown as included in the UE 420 and server(s) 502, in various embodiments, each node (e.g., the network devices 504, base station 410, data network 506, etc.) may execute or include an instance of the PDU manager 512. In some embodiments, the PDU manager 512 may be configured to execute a PDU-set delay budget (PSDB). The PSDB may define an upper bound for the time that a PDU set 604 may be delayed between two nodes of the network path (e.g., between the UE 420 and base station network device 504(1), network device 504(1) and base station 410, base station 410 and network device 504(N), and/or network device 504(N) and sever(s) 502). In various embodiments, the PSDB may define an upper bound for the time that a PDU set 604 may be delayed for both downlink (DL) and/or uplink (UL) traffic. For certain cellular quality of service (QoS) identifiers (e.g., 5QI), the values for the PSDB for UL and DL traffic may be the same. In the case of network access, the PSDB may be used to support the configuration of scheduling and link layer functions. In some embodiments, the PDU manager 512 may be configured to execute a PDU set discard time (PSDT). The PSDT may be an upper bound for the time that a PDU set 604 has been waiting for transmission (e.g., in a buffer) at the sender of a link layer protocol before being discarded. Similar to the PSDB, the PSDT may be applied to both UL and DL traffic.

In some embodiments, the PDU manager 512 may be configured to determine, receive, or otherwise identify information relating to the PDU set discard policy from a PDU 602 of the PDU set 604. For example, at the application layer, the application 508 generating the PDU(s) 602 may be configured to set or otherwise define various characteristics or settings of the PDU set discard policy. In some embodiments, the application 508 may be configured to define the PSDB/PSDT for the PDU set discard policy, the K/N ratio for the PDU set discard policy, or any other setting for the PDU set discard policy. The application 508 may be preloaded or preconfigured with various PDU discard settings. The application 508 may be configured to generate the PDUs 602 including the information relating to the PDU set discard policy. For example, the application 508 may be configured to incorporate, include, or otherwise indicate the information corresponding to the PDU set discard policy in a header of the PDU(s) 602 of the PDU set. For example, the application 508 may be configured to indicate the K/N ratio for discarding a PDU set 604 in the header (e.g., by configuring bits of the header to indicate the K/N ratio).

In some embodiments, the PDU manager 512 may be configured to determine, receive, or otherwise identify information relating to a data burst discard policy. The data burst discard policy may be similar to the PDU set discard policy. For example, the data burst discard policy may indicate various characteristics, settings, rules, etc. for selectively discarding a data burst including one or more PDU sets. The data burst discard policy may have, for example, a different threshold for discarding a data burst than the PDU set discard policy for PDU sets 604.

As described in greater detail below, the PDU manager 512 may be configured to selectively discard PDU sets 604 and/or data bursts 606 based on or according to the PDU set discard policy and/or data burst discard policy. For example, the PDU manager 512 may be configured to selectively discard PDU sets 604 and/or data bursts 606, based on or according to a count of PDUs 602 (e.g., of a PDU set 604 and/or of a data burst 606) received or otherwise identified by the PDU manager 512 within a time window. The time window may be, for example, set according to one of the discard policies. For instance, the time window may be a duration starting from receipt of a first PDU 602 of a PDU set 604. The PDU manager 512 may be configured to count the number of PDUs 602 received within the time window, and can apply the PDU set discard policy and/or data burst discard policy to the received PDUs 602, to selectively discard (or process) the PDU set 604 and/or data burst 606. The PDU manager 512 may be configured to discard the PDU set 604 and/or data burst 606 by deleting the PDU sets 604 (e.g., each PDU 602 which are linked to a common PDU set 604) or data burst 606 (e.g., each PDU set 604 sent in a common data burst 606) from memory, by removing the PDU sets 604 and/or data bursts 606 from a buffer, by dropping the PDU sets 604 and/or data bursts 606 from a transmission schedule for transmission, etc. The PDU manager 512 may be configured to process the PDU sets 604 (or data bursts 606) by transmitting the PDU sets 604 or data bursts 606 received from a buffer (e.g., from the application layer following the application 508 moving the PDU sets 604 to the buffer) to the next node along the network path, by pushing the PDU sets 604 (or data bursts 606) to the application layer for decoding and use by the application 508, etc.

Figure 8:
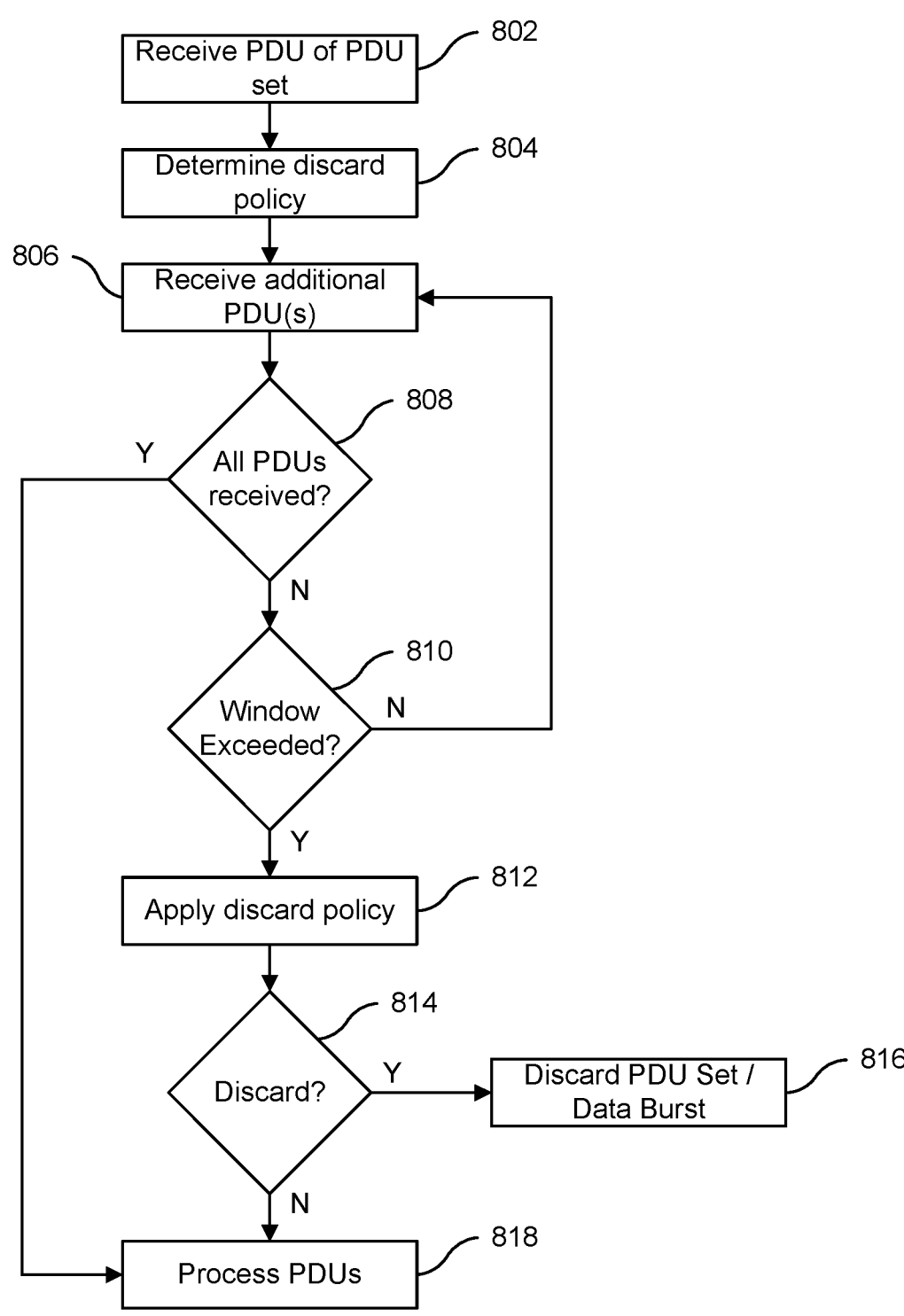
FIG. 8 is a flow chart of a method for protocol data unit (PDU) discard policies, according to an example implementation of the present disclosure.

Referring now to FIG. 8, depicted is a flowchart showing an example method 800 of applying PDU discard policies, according to an example implementation of the present disclosure. The method 800 may be performed by any device, component, or node along a network path between a sender device and a receiver device. For example, the method 800 may be performed by a sender device, to selectively discard or process PDUs generated at an application layer of the sender device prior to transmission to a receiver device. As another example, the method 800 may be performed by a network device, a base station, etc. (e.g., intermediary between the sender device and the receiver device). For instance, the method may be performed by a network device/base station, to selectively discard or forward on PDUs based on a PDU discard policy. As yet another example, the method 800 may be performed by a receiver device, to selectively discard or process PDUs successfully received by the receiver device via the network path from the sender device.

At step 802, a device may receive a PDU of a PDU set. In some embodiments, the device may receive the PDU via a queue or buffer from an application layer of the device. In some embodiments, the device may receive the PDU from another device (e.g., wirelessly via respective transceivers of the devices). In some embodiments, the device may receive the PDU from among a plurality of PDUs of a PDU set. The PDU received by the device may be any PDU of the PDU set (e.g., the first PDU through the N-th PDU). In some embodiments, the PDU may include information relating to a discard policy for PDU sets (or data bursts including multiple PDU sets). For example, the PDU may include the information relating to the discard policy in a header of the PDU. The discard policy may be or include a PDU set discard policy and/or a data burst discard policy. The application/source which generated the PDU may set, define, or otherwise configure the discard policy. In some embodiments, the source may configure the discard policy based at least on negotiated parameters between the endpoints, traffic type of payload data included in the PDUs, traffic conditions of the network path, pre-configured to predetermined PDU discard settings, etc.

At step 804, the device may determine a discard policy for the PDUs. In some embodiments, the device may determine the discard policy for PDU sets and for data bursts. The device may determine a first discard policy for PDU sets and a second discard policy for data bursts. The device may determine the discard policy for the PDUs, based at least on the information included in the first PDU received by the device (e.g., at step 802). The device may determine the discard policy based at least on the information provided in the header of the PDU.

At step 806, the device may receive additional PDUs of the PDU set. Step 806 may be similar to step 802. In some embodiments, the device may determine a count of PDUs received (e.g., at step 802 and step 806). The device may determine a count of PDUs to be received by the device. In some embodiments, the device may determine the count of PDUs to be received, based on information included in the PDUs (e.g., in the header, similar to the information relating to the discard policy). For example, the PDU may include information indicating a total number of PDUs included in a PDU set. The device may extract or otherwise identify the total number of PDUs based at least on the information included in the header of the PDUs. The device may maintain a count of PDUs, which is updated as new PDUs are received (e.g., at step 806).

At step 808, the device may determine whether all PDUs of a PDU set have been received. The device may determine that all PDUs of the PDU set have been received, responsive to the count of PDUs received (e.g., at step 802 and 806) matching the count of PDUs to be received. Where the device determines that all PDUs have been received, the method 800 may proceed to step 818. Where the device determines that all PDUs have not been received (e.g., there are one or more remaining PDUs to be received by the device), the method 800 may proceed to step 810.

At step 810, the device may determine whether a time window has been exceeded. The time window may be or include a duration, starting from receipt of the first PDU of a PDU set (e.g., commencing step 802) during which PDUs are permitted to be received. The duration may be set according to the discard policy, may be preconfigured, etc. The duration may be, for example, similar to the PDU-set delay budget and/or the PDU set discard time. Where the time window has not been exceeded, the method 800 may loop back to step 806 (e.g., where the device receives additional PDU(s)). Where the time window has been exceeded, the method 800 may proceed to step 812.

At step 812, the device may apply a discard policy to the received PDUs of the PDU set. In some embodiments, the device may apply the discard policy to the received PDUs which are received within the time window. The device may apply the discard policy to the received PDUs, to selectively discard each of the PDUs of the PDU set according to the discard policy. The device may apply the discard policy to the received PDUs responsive to the time window being exceeded (e.g., and each of the PDUs of the PDU set having not been received). In other words, the device may apply the discard policy in instances where the time window has been exceeded and one or more PDUs are to be received, but have not yet been received (e.g., are outstanding PDUs).

In some embodiments, the discard policy may be a PDU set discard policy. In some embodiments, the discard policy may be a data burst discard policy. In some embodiments, the discard policy may include both a PDU set discard policy and a data burst discard policy. In some embodiments, the discard policy may include information relating to a minimum ratio of PDUs of the PDU set/data burst successfully received by the first device. The minimum ratio may be less than 1, for example (e.g., meaning that applying the discard policy may result in not discarding PDUs for some instances where the fewer than all PDUs of a PDU set are received).

At step 814, the device may determine whether or not to discard each of the PDUs of a PDU set, and/or each of the PDU sets of a data burst, based on applying the discard policy to the received PDUs. The device may determine whether or not to discard the PDUs based on the count of the PDUs received to the count of the expected or sent PDUs of each PDU set. At step 816, where the device determines to discard the PDUs, the device may discard each of the PDUs of the PDU set successfully received. The device may discard the PDUs, by deleting the PDUs from memory, discarding the PDUs, not forwarding the PDUs to a next endpoint, or otherwise dropping the PDUs. In some embodiments, the device may discard a plurality of PDU sets of a data burst. The device may discard each of the PDU sets of a data burst, according to the count of received PDUs of the data burst. At step 818, where the device determines to not discard the PDUs, the device may process the received PDUs. In some embodiments, the device may process the received PDUs by forwarding the received PDUs to a next endpoint (e.g., along a network path from the sender device to the receiver device). In some embodiments, the device may process the received PDUs by forwarding the received PDUs from the buffer of the sender device to the endpoint (e.g., receiver device). In some embodiments, the device may process the received PDUs by forwarding the PDUs received at the receiver device to the application layer for decoding and processing of the PDUs.

With reference to FIG. 6 and FIG. 8, an example scenario is described herein, but the present disclosure is not limited to this particular example. Rather, the example scenario is intended to be illustrative. In this example scenario, a first device may generate three PDU sets 604, each having three respective PDUs 602. The first device may generate the three PDU sets 604 at the application layer, and can store the PDUs in the buffer for transmission via an antenna or transceiver of the first device to a second device. The first device may indicate, in the PDUs of each set, at least a count of the total number of PDUs generated by the first device (e.g., nine PDUs in three PDU sets), a PDU set discard policy (e.g., ratio of 0.5), and a data burst discard policy (e.g., ratio of 0.5). At the physical layer, the first device may determine a count of the received PDUs of the PDU sets (e.g., 9 total PDUs) from the buffer, and can determine that the count matches an expected number of PDUs (e.g., indicated in the header of the PDUs). The first device may transmit the PDUs as a data burst 606 including each of the three PDU sets, along the network path to the second device.

At each leg or node along the network path, a receiver device of the PDUs may apply the discard policy (or policies) indicated in the PDUs to the PDU set. For example, assuming the first device is the UE 420 and the second device is the server(s) 502, each network device 504 and base station may apply the discard policy to received PDUs, to determine whether or not to selectively discard the received PDUs. The receiver device may apply the data burst discard policy to the data burst 606, and PDU set discard policy to the PDU sets 604 of the data burst 606.

Assuming that the PDU count of received PDUs matches the expected count of PDUs, the receiver device may process the PDUs (e.g., to forward on the PDUs to the next node or leg). However, in some instances, one or more PDUs may be dropped (e.g., due to interference, due to data corruption, due to transmission delay as defined by the time window, etc.). As PDUs are dropped along the network path, the receiver devices may determine whether or not to drop the PDU sets/data burst. In some instances, the receiver device may drop individual PDU sets of a data burst while maintaining the data burst, or may drop the entire data burst.

Continuing this example, one PDU 602 from the first PDU set 604 may be dropped, two PDUs 602 from the second PDU set 604 may be dropped, and one PDU 602 from the third PDU set 604 may be dropped along the network path. In other words, a receiver device may successfully receive two PDUs 602 of the first PDU set 604, one PDU 602 of the second PDU set 604, and two PDUs 602 of the third PDU set 604. The receiver device may apply the policies to the respective counts, to determine whether or not to discard PDU sets and/or the data burst. Assuming both the PDU set discard policy and data burst discard policy indicate minimum ratios of 0.5, the receiver device may determine to process the data burst 606 (e.g., because the count of received PDUs of the data burst is a ratio of 5/9, or greater than the minimum ratio of 0.5). However, the receiver device may determine to drop the second PDU set 604 (e.g., because the count of received PDUs of the second PDU set 604 is a ratio of 1/3, or less than the minimum ratio of 0.5). Each of the devices/components/hardware along the network path may apply the discard policies to the received PDUs, to selectively discard the received PDUs and/or process the PDUs.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
   receiving, by a first device, a first protocol data unit (PDU) of a PDU set, the first PDU including information relating to a PDU set discard policy;
   receiving, by the first device, one or more second PDUs of the PDU set within a time window; and
   applying, by the first device, the PDU set discard policy to the PDU set, based at least on a count of PDUs of the PDU set received within the time window, to selectively discard each of the PDUs of the PDU set according to the PDU set discard policy.

2. The method of claim 1, wherein the PDU set discard policy comprises information relating to a minimum ratio of PDUs of the PDU set successfully received by the first device.

3. The method of claim 2, further comprising:
   discarding, by the first device, the first PDU and the one or more second PDUs of the PDU set, responsive to a ratio of the count of PDUs received within the time window to a number of PDUs of the PDU set not satisfying the minimum ratio.

4. The method of claim 2, further comprising:
   processing, by the first device, the first PDU and the one or more second PDUs of the PDU set, responsive to a ratio of the count of PDUs received within the time window to a number of PDUs of the PDU set satisfying the minimum ratio.

5. The method of claim 4, wherein the minimum ratio is less than 1.

6. The method of claim 4, wherein processing the first PDU and the one or more second PDUs comprises transmitting, by the first device, the first PDU and the one or more second PDUs to a second device.

7. The method of claim 1, wherein receiving the first PDU and receiving the one or more second PDUs comprise:
   receiving, by the first device, via a buffer from an application layer of the first device, the first PDU of the PDU set; and
   receiving, by the first device, via the buffer from the application layer of the first device, the one or more second PDUs of the PDU set.

8. The method of claim 1, wherein receiving the first PDU and receiving the one or more second PDUs comprise:
   receiving, by the first device, from a second device, the first PDU of the PDU set; and
   receiving, by the first device, from the second device, the one or more second PDUs of the PDU set.

9. The method of claim 8, wherein the second device comprises at least one of user equipment, a server, or a network device.

10. The method of claim 1, wherein the PDU set is one of a plurality of PDU sets of a data burst, and wherein the PDU set discard policy is applied to each of the plurality of PDU sets, and wherein the information further comprises a data burst discard policy, the method further comprising:
   applying, by the first device, the data burst discard policy to the plurality of PDU sets, based on a second count of PDUs of the plurality of PDU sets of the data burst received within the time window, to selectively discard each of the plurality of PDU sets according to the data burst discard policy.

11. A device comprising:

a transceiver; and one or more processors configured to:

receive, via the transceiver, a first protocol data unit (PDU) of a PDU set, the first PDU including information relating to a PDU set discard policy;

receive, via the transceiver, one or more second PDUs of the PDU set within a time window; and apply the PDU set discard policy to the PDU set, based on a count of PDUs of the PDU set received within the time window, to selectively discard each of the PDUs of the PDU set according to the PDU set discard policy.

12. The device of claim 11, wherein the PDU set discard policy comprises information relating to a minimum ratio of PDUs of the PDU set successfully received by the first device.

13. The device of claim 12, wherein the one or more processors are configured to:

discard the first PDU and the one or more second PDUs of the PDU set, responsive to a ratio of the count of PDUs received within the time window to a number of PDUs of the PDU set not satisfying the minimum ratio.

14. The device of claim 12, wherein the one or more processors are configured to:

process the first PDU and the one or more second PDUs of the PDU set, responsive to a ratio of the count of PDUs received within the time window to a number of PDUs of the PDU set satisfying the minimum ratio.

15. The device of claim 14, wherein the minimum ratio is less than 1.

16. The device of claim 14, wherein, to process the first PDU and the one or more second PDUs, the one or more processors are configured to transmit, via the transceiver to a second device, the first PDU and the one or more second PDUs.

17. The device of claim 11, wherein the one or more processors are configured to:

receive, by the transceiver via a buffer from an application layer of the first device, the first PDU of the PDU set; and receive, by the transceiver via the buffer from the application layer of the first device, the one or more second PDUs of the PDU set.

18. The device of claim 11, wherein the one or more processors are configured to:

receive, by the transceiver from a second device, the first PDU of the PDU set; and receive, by the transceiver from the second device, the one or more second PDUs of the PDU set.

19. The device of claim 18, wherein the second device comprises at least one of user equipment, a server, or a network device.

20. A non-transitory computer readable medium storing instructions that, when executed by one or more processors, cause the one or more processors to:

receive a first protocol data unit (PDU) of a PDU set, the first PDU including information relating to a PDU set discard policy;

receive one or more second PDUs of the PDU set within a time window; and apply the PDU set discard policy to the PDU set, based on a count of PDUs of the PDU set received within the time window, to selectively discard each of the PDUs of the PDU set according to the PDU set discard policy.

* * * * *